Inventor:
HANS MÜLLER

United States Patent Office 3,537,690
Patented Nov. 3, 1970

3,537,690
APPARATUS FOR AGITATING FLUIDS
Hans Muller, Alte Landstrasse 415,
Mannedorf, Zurich, Switzerland
Filed Dec. 19, 1968, Ser. No. 785,100
Claims priority, application Switzerland, Dec. 21, 1967,
17,905/67
Int. Cl. B01f 7/16
U.S. Cl. 259—66        7 Claims

ABSTRACT OF THE DISCLOSURE

An apparatus for agitating fluids includes a vessel having two end walls and a circumferential wall of transparent material which is liable to shatter under certain conditions. Agitating means is located within the vessel for agitating the contents thereof. A mechanical protective shield is provided and can be affixed by releasable coupling means so as to surround the exterior of the circumferential wall, to be used in conditions where the latter is liable to shatter so as to protect persons and equipment in the vicinity of the apparatus. The shield can be removed when the conditions likely to lead to shattering of the circumferential wall do not obtain.

BACKGROUND OF THE INVENTION

The present invention relates generally to apparatus for agitating of fluids, and more particularly to an apparatus for carrying out fermentation processes.

Fermentation processes are microbiologically oriented processes for which apparatuses are well known. Of course, the type and size of apparatus used for carrying out a fermentation process depends to a large extent upon the purposes immediately at hand. Thus, for processes intended for test purposes and research purposes apparatuses are known consisting of two plate-like end walls and a hollow cylindrical circumferential wall of transparent material, usually glass, which is fluid-tightly secured to the end walls between the same. A rotating mixing ore agitating unit is located in the interior of the thus-constituted vessel and the operation of the agitating unit, as well as the progress of the fermentation process, can be observed through the transparent circumferential wall. This is highly important but brings with it the disadvantage that under certain conditions, particularly where higher pressures and temperatures are involved, the material of the transparent circumferential wall is liable to shatter. Evidently, this could expose persons and equipment in the vicinity of the apparatus to certain dangers.

Furthermore, apparatus of this type wherein the processes are based on the presence of microbiological organisms, must always be sterilized before a new test or a new process is begun. Such sterilization is generally carried out with steam and as a result the danger that the circumferential wall of transparent material might shatter exists almost constantly. Also, where important tests are made and infections by spore-forming bacteria must be excluded, steam under higher pressure and under higher temperature than otherwise is utilized. Because these test fermentation vessels are very often connected with permanently installed control apparatuses, drive apparatuses and the like, the customary sterilization of the vessels in an autoclave is not possible. Therefore, the sterilization must be carried out in the open, with the outlined dangers should the circumferential wall of transparent material shatter.

SUMMARY OF THE INVENTION

It is, accordingly, an object of the present invention to provide an apparatus of the character in question wherein danger to persons and material or equipment in the vicinity of the apparatus is eliminated in the event that shattering of the circumferential wall of transparent material should occur for any reason, including sterilization with high-pressure steam.

More particularly, it is an object of the present invention to provide such an apparatus wherein these dangers are precluded, but not at the expense of losing the excellent observation which is afforded of the interior of the vessel through the circumferential wall of transparent material.

In accordance with the above objects, and others which will become apparent hereafter, one feature of my invention resides in the provision of an apparatus of the type under discussion which includes a vessel having two end walls, and a circumferential wall of transparent material which is liable to shatter in certain conditions of use of the apparatus. Agitating means is located interiorly of the vessel and operative for agitating the contents thereof. Protective mechanical shield means exteriorly surrounds the circumferential wall at least when the apparatus undergoes conditions of use in which the material of the circumferential wall is liable to shatter. Coupling means releasably couples the shield means with at least one of the end walls so that the shield means may be removed and the circumferential wall exposed for viewing of the interior of the vessel when the apparatus undergoes conditions of use in which the material of the circumferential wall is not liable to shatter.

Advantageously, my mechanical shield means may consist of steel or another material having high mechanical strength and resistance to breakage or shattering is also suitable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
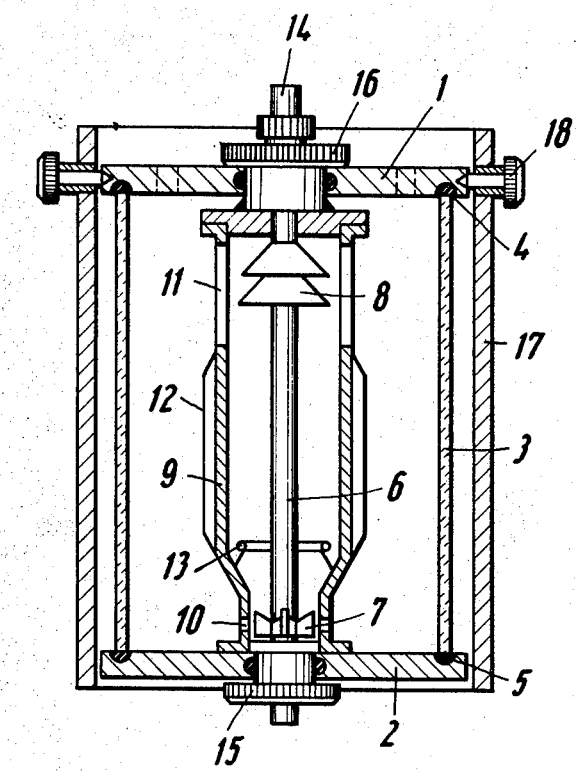
FIG. 1 is a somewhat diagramatic sectional elevation through an apparatus embodying my invention.

Discussing now the drawing in detail, it will be soon that the vessel of my novel apparatus includes two substantially plate-shaped end walls 1 and 2 which consist of metallic material in the illustrated embodiment. Interposed between these end walls 1 and 2 is a tubular circumferential wall 3 which here is shown as consisting of glass. The necessary seal between the opposite axial end portions of the circumferential wall 3 and the end walls 1 and 2, respectively, is provided by sealing rings 4 and 5 which are interposed between the end portions of the circumferential wall 3 and the respective end walls 1 and 2 and compressed therebetween. While this is of no criticality with respect to my inventive concept, it is pointed out that it is advantageous to have the sealing rings 4 and 5 recessed in annular grooves provided in the end walls 1 and 2, as illustrated in FIG. 1.

A rotatable shaft 6 extends through the vessel coaxially therewith and carries an agitating device 7 of any known construction and a foam separator 8 also known to those skilled in the art. The shaft 6 is driven in rotation in suitable manner by a nonillustrated motor located exteriorly of the vessel. A guide tube 9 surrounds the shaft 6 as well as the agitating device 7 and the foam separator 8 and it provided at the level of the former with apertures 10 and at the level of the latter with cutouts 11 which are relatively large. A double-walled jacket 12 surrounds the tube 9 over at least part of its axial length or height so that a cooling or heating medium can be introduced into the jacket 12 from exteriorly of the vessel, as desired and in any well known manner which is not illustrated because it does not form a part of the invention.

The oxygen-containing gases which must be supplied for aerobic processes are introduced in known manner through an annular tube 13 provided with small foramina and located within the confines of the guide tube 9. Gases liberated during the fermentation process and separated by the foam separator are evacuated through the hollow shaft portion 14.

In the illustrated embodiment the guide tube 9 is of relatively significant wall thickness and constitutes a rigid unit with the journalling for the rotating shaft 6; its opposite end portions extend outwardly through and beyond the end walls 1 and 2, necessary seals being provided as illustrated, and are provided with exterior screw threads onto which nuts 15 and 16 are threaded which exteriorly abut against the end walls 1 and 2, respectively, and thus serve to press the latter axially against the circumferential wall 3, thereby compressing the sealing rings 4 and 5 between themselves and the circumferential wall 3.

Figure 2:
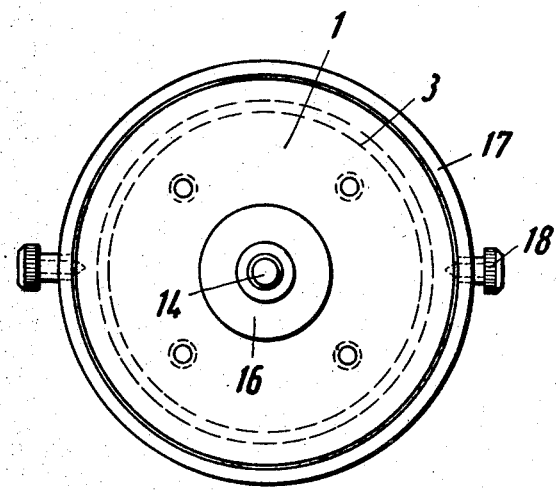
FIG. 2 is a top-plan view of FIG. 1.

During operation of the apparatus thus far described, whose appearance as seen from the top and shown in FIG. 2, the contents of the vessel and their behavior can be observed through the transparent circumferential wall 3. The material of the latter is, however, liable to shatter under the circumstances outlined earlier, for instance if high pressures must prevail in the interior of the vessel, or if steam at high pressure is introduced for sterilization purposes. To guard persons and equipment in the vicinity of the apparatus against injuries and damage which might occur if the circumferential wall 3 shatters under these circumstances, I provide a shield means in form of a tubular member 17 which exteriorly surrounds the circumferential wall 3. The member 17 advantageously consists of steel but could be made of another material having high mechanical strength. Coupling means is provided, here shown in form of knurled screws 18, serve to releasably connect the tubular member 18 with at least one of the end walls, in the illustrated embodiment of the end wall 1. To this end the tubular member 17 is provided with two or more circumferentially spaced apertures all located in a common transversal plane and which may either be capped or which may have sleeves secured therein which in turn are capped. The screws 18 are threaded through these apertures and their tips engage in depressions provided in the edge face of the end wall 1. Similar screws can be provided to cooperate with the end wall 2 if desired or necessary.

When the tubular shield member 17 is not needed because no danger of shattering of the circumferential wall 3 exists, the screws 18 are unthreaded and the member 17 removed by axial withdrawal. All internal parts of the apparatus, particularly the agitating device, the guide tube 9, the foam separator and the like are readily accessible by unthreading the nuts 15 and 16 and removing the end wall 1 so that the vessel can be readily cleaned as can the interior components, and also ready substitution or inspection of these components is made possible.

If the apparatus is to be subjected to sterilization by steam at high pressure, the tubular shield member 17 is placed about the vessel as illustrated, and the screws 18 tightened. Thereupon the steam is introduced in suitable manner, for instance an inlet valve provided in one of the end walls and after termination of the sterilization and evacuation of the steam the shield member 17 can again be removed to facilitate viewing of the interior of the vessel through the circumferential wall 3. It will be appreciated that the tubular shield member 17 need not be entirely separated from the apparatus, but can for instance be removed, reversed and can be secured to the end wall 1 with the screws 18. On the other hand if the apertures and screws are provided not only at one end of the tubular shield member 17, but also at the other end so as to cooperate normally with the end wall 2, then the shield member 17 can be put into an inoperative position by sliding it upwardly until the screws which ordinarily cooperate with the end wall 2 are in a position where they can cooperate with the end wall 1, to thereupon be tightened and hold the shield member 17 inoperatively above and in axial alignment with the major portion of the vessel.

Resort to my novel invention makes it possible in the most simple manner to sterilize the apparatus with steam under high pressure without subjecting personnel or equipment in the vicinity of the apparatus to any danger and without necessitating a disconnection of the apparatus from drive and control devices needed for it.

It will be understood that each of the elements described above, or two or more together may also find a useful application in other types of constructions differing from the types described above.

While the invention has been illustrated and described as embodied in a fermentation apparatus, it is not intended to be limited to the details shown, since various modifications and structural changes may be made without departing in any way from the spirit of the present invention.

What is claimed as new and desired to be protected by Letters Patent is set forth in the appended claims.

I claim:

1. An apparatus of the character described comprising, in combination, a vessel including two end walls, and a circumferential wall of transparent material liable to shatter in certain conditions of use of said apparatus; agitating means located interiorly of said vessel and operative for agitating the contents thereof; protective mechanical shield means exteriorly surrounding said circumferential wall at least when said apparatus is undergoing conditions of use in which the material of said circumferential wall is liable to shatter; and coupling means releasably coupling said shield means with at least one of said end walls so that the shield means may be removed and said circumferential wall exposed for viewing of the interior of the vessel when the apparatus is undergoing conditions of use in which the material of said circumferential wall is not liable to shatter.

2. Apparatus as defined in claim 1, wherein said circumferential wall consists of vitreous material.

3. Apparatus as defined in claim 1, each of said end walls being of substantially plate-shaped configuration each having a surface facing the other end wall, said circumferential wall being of tubular configuration and having opposite end portions respectively proximal to one of said end faces, a sealing gasket located between the respectively associated end face and end portion, and means urging the two latter towards one another to thereby compress the respective sealing gasket therebetween.

4. Apparatus as defined in claim 3, said end walls consisting of metallic material.

5. Apparatus as defined in claim 3, said agitating means including an elongated member located coaxially in said vessel and having end portions extending axially beyond said end walls and provided with screw threads; and wherein said means comprise nut means meshing with the respective screw threads on said end portions and abutting against said end walls urging the same axially towards said tubular circumferential wall.

6. Apparatus as defined in claim 1, said shield means consisting of metallic material.

7. Apparatus as defined in claim 6, wherein said metallic material is steel.

References Cited

UNITED STATES PATENTS

| | | | |
|---|---|---|---|
| 2,436,585 | 2/1948 | Mangold | 259—66 X |
| 2,958,517 | 11/1960 | Harker | 259—108 |
| 3,297,308 | 1/1967 | Philipps | 259—67 |
| 3,307,834 | 3/1967 | Wilde | 259—66 |

ROBERT W. JENKINS, Primary Examiner